Jan. 16, 1923.
E. MOORE.
COMBINED IMPULSE COUPLING AND GOVERNING MECHANISM.
FILED JULY 21, 1919.
1,442,354.
5 SHEETS—SHEET 2.
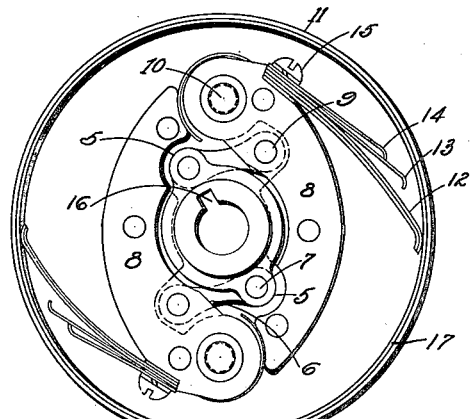
Fig-3
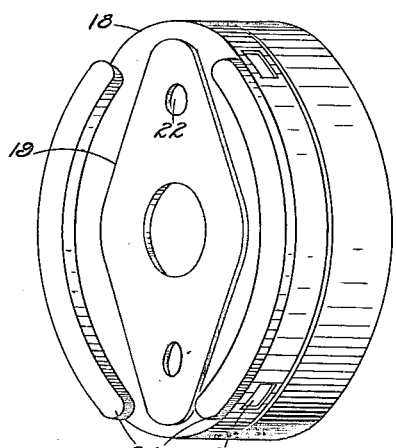
Fig-4
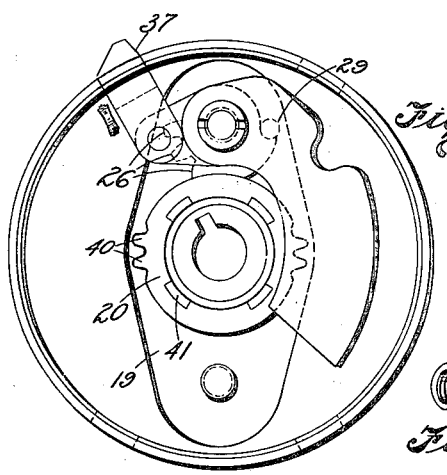
Fig-5
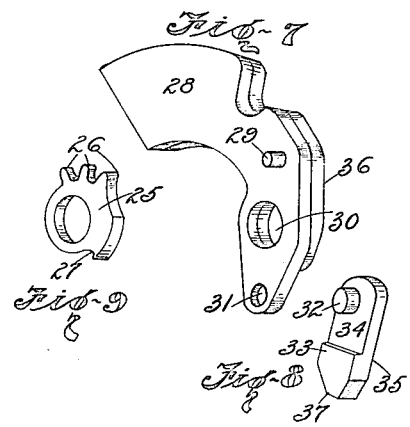
Fig-7
Fig-10
Fig-9
Fig-8
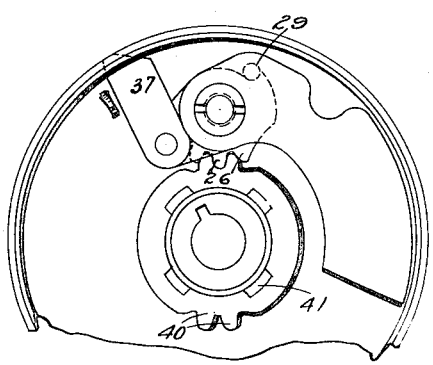
Fig-6
INVENTOR
EDWARD MOORE
BY
Albion D. F. Libby
ATTORNEY Jan. 16, 1923.

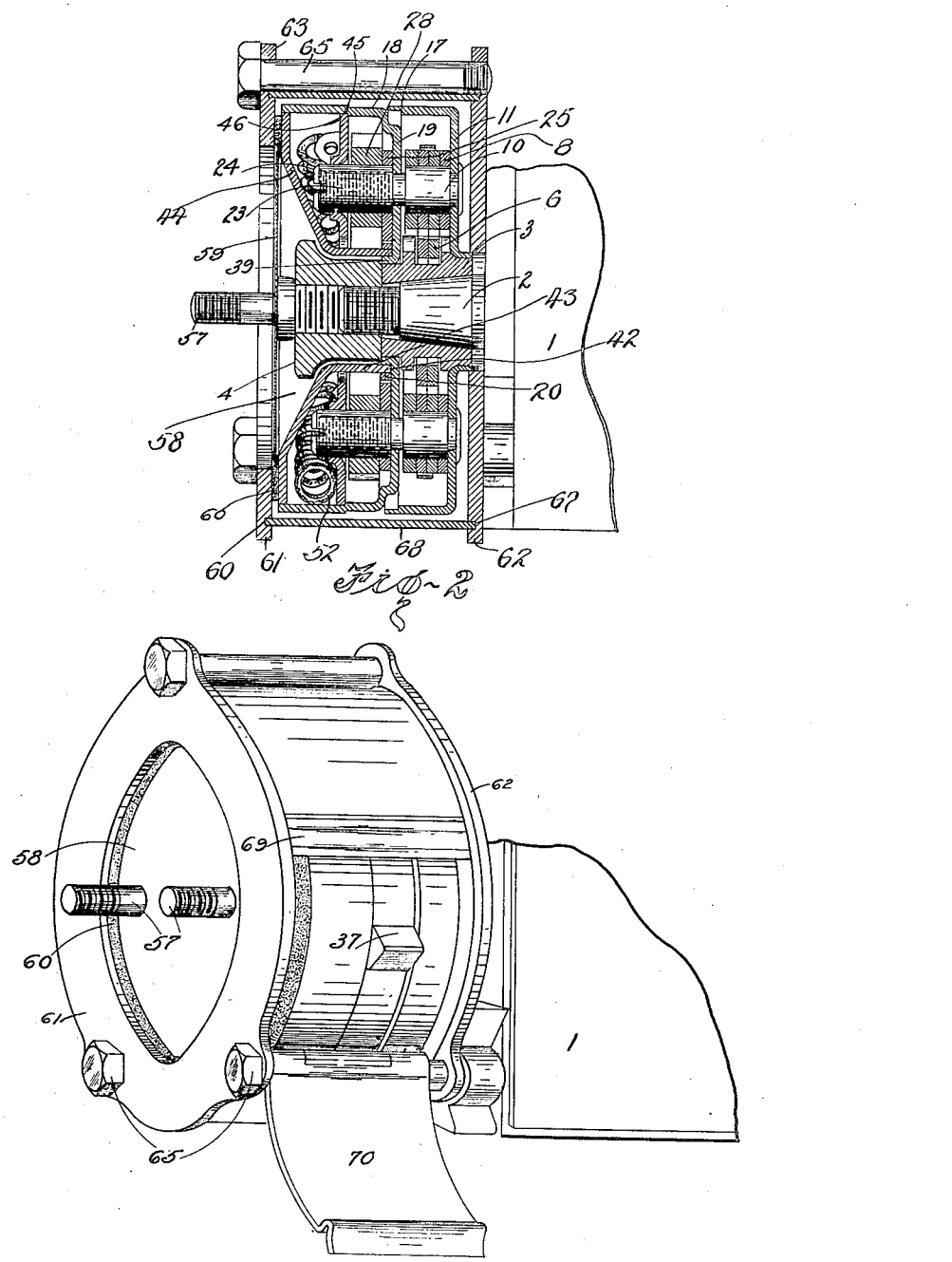

E. MOORE.

COMBINED IMPULSE COUPLING AND GOVERNING MECHANISM.
FILED JULY 21, 1919.

INVENTOR
EDWARD MOORE
BY
Albion D. T. Libby
ATTORNEY

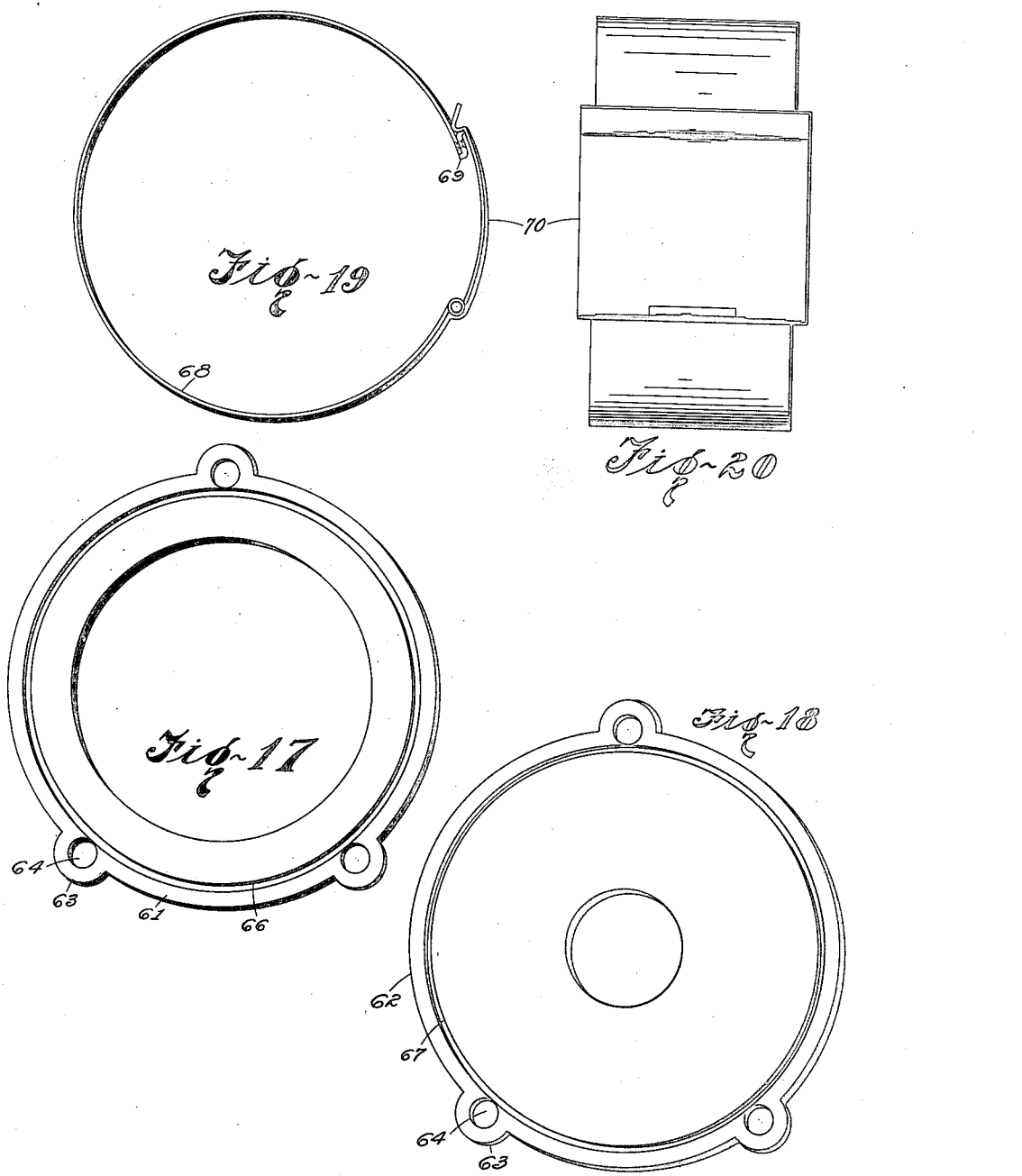

Jan. 16, 1923.
E. MOORE.
COMBINED IMPULSE COUPLING AND GOVERNING MECHANISM.
FILED JULY 21, 1919.
1,442,354.
5 SHEETS—SHEET 5.
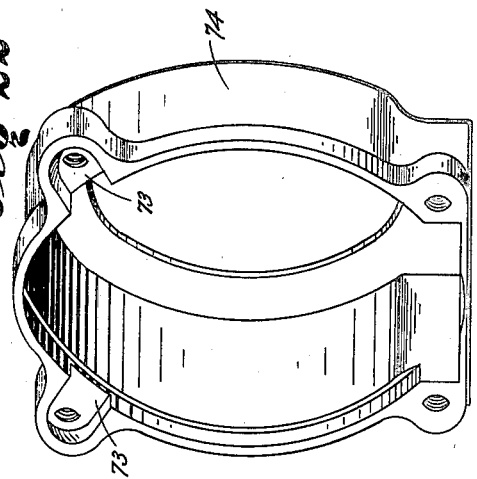
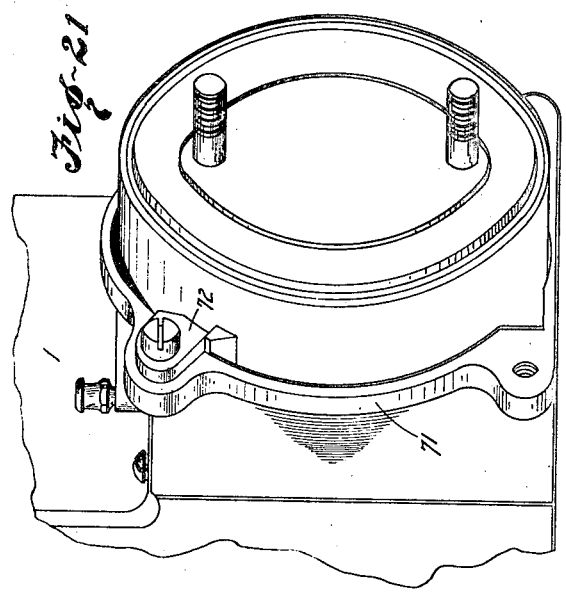
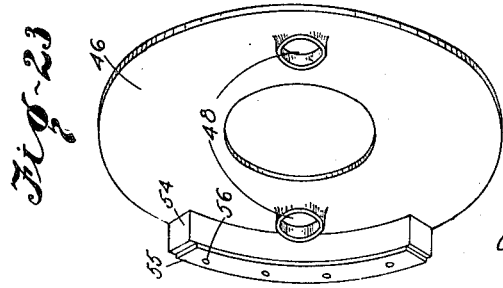
INVENTOR
EDWARD MOORE
BY
Albion D. T. Libby
ATTORNEY Patented Jan. 16, 1923.

1,442,354

UNITED STATES PATENT OFFICE.

EDWARD MOORE, OF NEWARK, NEW JERSEY, ASSIGNOR TO SPLITDORF ELECTRICAL COMPANY, OF NEWARK, NEW JERSEY.

COMBINED IMPULSE COUPLING AND GOVERNING MECHANISM.

Application filed July 21, 1919. Serial No. 312,422.

*To all whom it may concern:*

Be it known that I, EDWARD MOORE, a citizen of the United States, residing at Newark, in the county of Essex and State of New Jersey, have invented certain new and useful Improvements in a Combined Impulse Coupling and Governing Mechanism, of which the following is a specification.

In order to increase the efficiency of an internal combustion engine, it is essential that the spark be advanced or retarded in proportion to the speed of rotation of the engine crank shaft. Where manual control is used the best sparking point is hard to find by the ordinary driver and automatic controlling devices have been proposed and used which will automatically give the proper sparking point without regard to any manual control. Such governing devices are particularly useful in the operation of internal combustion engines used on trucks. Engines for this class of work, especially on the larger trucks, are of considerable power and are somewhat difficult to crank. It has been found that a magneto generator provides the best and most reliable ignition for this service, but due to the difficulty of cranking the large engines the rotative speed of the crank shaft and magneto at the time when the charge should be fired, is very low and the spark from the magneto is not as strong as it should be. To overcome this difficulty impulse couplings have been proposed and used, which devices will give an equivalent spark fully equal to that delivered by the magneto when turned at several hundred revolutions so that a strong spark is produced no matter how slowly the engine may be cranked over the compression point, at which time the spark is produced.

It is the principal object of my invention to combine an impulse starting mechanism together with the automatic governing device into a single unitary structure which may be completely enclosed and which will occupy but a slightly greater space than either one of the separate devices.

Another object of my invention is to provide a device of the character described in which the parts are so constructed that they may be quickly reversed for right or left hand rotation as circumstances may require.

Other and further objects will be apparent after a study of this specification and the drawings which form a part thereof..

In the drawings, Figure 1 shows a section of a magneto with my combined impulse governing device attached thereto but with the outer protecting cap removed and the latch cover that covers the tripping dog in open position.

Figure 2 is a vertical sectional view through the device shown in Figure 1, but with the protecting cap in place.

Figure 3 is a plan view of the governing device within its casing.

Fgure 4 is an assembled view of the impulse casing as removed from the casing shown in Figure 3.

Figure 5 is a view of part of the impulse mechanism mounted within, the casing shown in Figure 4 with certain of the parts in starting position.

Figure 6 is a view similar to Figure 5 but wth the corresponding parts in the running parts.

Figure 7 is a perspective view of the centrifugal member shown in Figure 5.

Figure 8 is a perspective view of the tripping dog.

Figure 9 is a perspective view of one of the impulse members.

Figure 10 is a perspective view of one of the sleeves carrying the parts shown in Figures 7 and 9.

Figure 11:
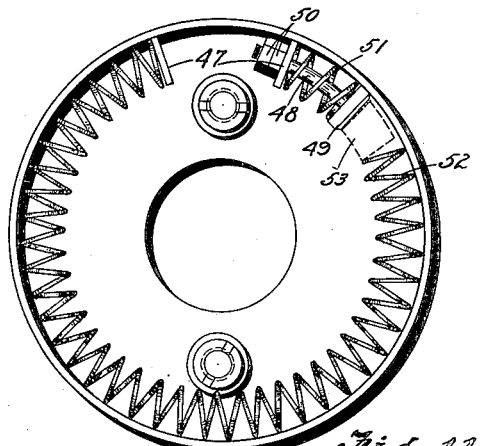

Figure 11 is a right hand end view of the part shown in Figure 4 but with the driving member removed.

Figure 12:
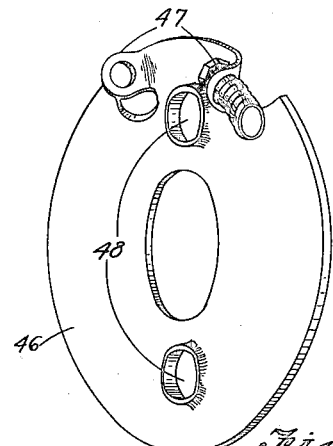

Figure 12 is a perspective view of the plate carrying the impulse spring as shown in Figure 11.

Figure 13:
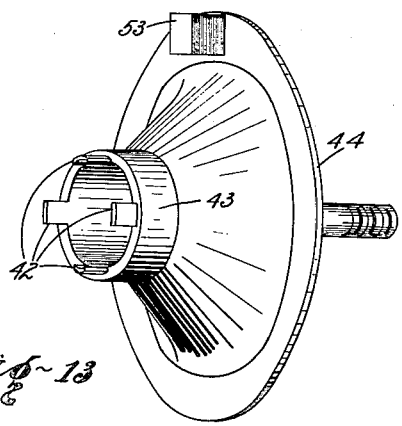

Figure 13 is a view of the driving member showing the parts projecting toward the interior of the casing of Figure 4.

Figure 14:
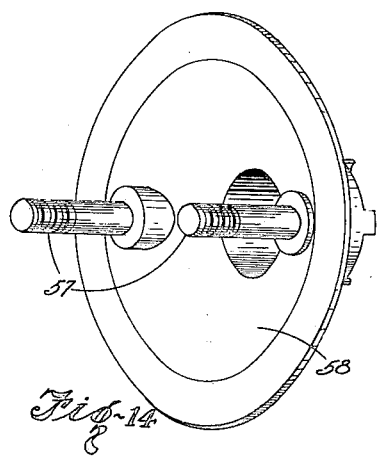

Figure 14 is a view of the driving member shown in Figure 13 but from the opposite side.

Figure 15:
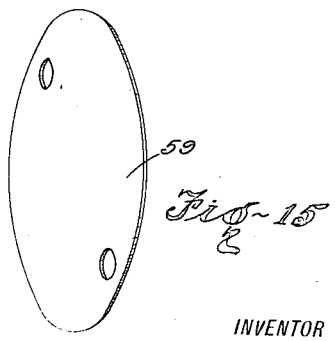

Figure 15 is a view of the outer cover plate, and

Figure 16:
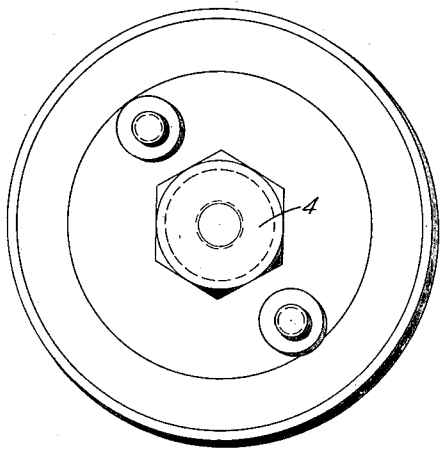

Figure 16 is an end view of the device with the plate illustrated in Figure 15 in position but with the mounting plates removed.

Figure 17 is a view of the front mounting plate.

Figure 18 is a view of the rear mounting plate.

Figure 19 is a side view of the cover strap.

Figure 20 is a side elevation of the strap shown in Figure 19.

Figure 21 is an end view of an ignition generator with my complete device mounted within a dustproof casing, part of which constitutes preferably the end plate of the magneto.

Figure 22 is a perspective view of the remainder of the casing shown in Figure 21.

Figure 23 is a modified form of an impulse spring plate which may be used instead of the plate shown in Figure 12.

Referring now to the details, wherein like numbers refer to corresponding parts in the various views, 1 is a magneto having driving shaft 2. A member 3 is carried on the tapered end 2 in any suitable manner as by means of a key and keyway 16 and a nut 4, shown in Figure 16. The member 3 has ears 5 to which are fastened links 6 in any suitable manner, as by pins 7. The opposite end of the links 6 are attached to centrifugally operated weighted arms 8, in any suitable manner as by pins 9. The arms 8 are carried on studs 10 that are securely fastened to the casing 11. The arms 8 also carry springs 12, 13 and 14 which are fastened thereto as by screws 15. No further detail description of these parts need be given as they are fully described in my co-pending application, Serial No. 217,862, filed February 18, 1918, but it will be readily perceived that as the weighted arms 8 move in and out, under the influence of centrifugal force as modified by the springs 12, 13 and 14, there will be relative displacement between the casing 11 carrying the studs 10 and arms 8 and the magneto shaft 2.

The casing 11 has an annular shoulder 17 within which fits a second casing 18. A portion of the bottom of the casing 18 is punched downward as at 19 in order to provide a space for the members 20 and 25 which will be hereinafter referred to, and in order to give bearing surface around the annular shoulder 17, spacing blocks 21 are attached to the outer bottom of the said casing 18. Studs 10 project through the holes 22, and have their outer ends threaded at 23 to receive the bearing sleeves 24. Carried on the bearing sleeves 24 within the upper ends of the depression 19 are members 25 having teeth 26 and a notch 27. Also carried on the bearing sleeves 24 are weighted arms 28. The arms 28 carry pins 29 adapted to engage the notch 27 as shown in Figure 5. Adjacent to hole 30 in the members 28 is a second hole 31 adapted to receive pin 32 carried by the dog 33. Dog 33 is milled off at 34 so that when the pin 32 is in hole 31 the bottom surface 35 of the dog is on a line with the bottom surface 36 of the arms 28. The nose 37 of the dog 33 is adapted to project through the holes 38 of the casing 18 as shown in Figure 5. Seated within the central part of the depression 19 and around the central hub 39 of the casing 18 and the inner end of member 3 which preferably projects through the hub 39, is member 20 having teeth 40 and slots 41. The slots 41 are adapted to receive fingers 42 formed on the hub 43 of driving member 44 when the member 44 is in position as will be clearly seen from Figure 2. For the sake of clearness only one of the members 28 and dogs 33 are shown in Figures 5 and 6 but it is to be understood that what is said in connection with one applies to the other. The casing 18 has an annular shoulder 45 within its interior. Seated on the annular shoulder 45 is a plate 46. Plate 46 has two similarly formed ears 47 formed thereon and holes 48 through which the bearing sleeves 24 pass. A stud 48 having a head 49 is fastened to one of the ears 47 in any suitable manner as by nuts 50. A resilient member 51 serves to hold the stud in position in Figure 11. Mounted between the head of the stud 49 and the other ear 47 is a spring 52. The driving member 44 has fastened thereto a lug 53 which when the driving member 44 is in assembled position, is in the position shown in dotted lines in Figure 11. Spring 52 serves as an impulse spring while the resilient member 51 acts as a buffer spring to receive the shock of the driven parts when they have been released at the time of producing the impulse. It will be seen that the ears 47 are so formed that stud 48 may be mounted on either one of them as the device is required for right or left hand rotation.

In the form of impulse spring shown in Figure 23, in place of the ears 25 and the buffer spring 51, I may use a block 54 of shock absorbing material, such as fiber, which may be held to the plate 46 in any suitable manner such as by metal plate 55 and rivets 56. When this construction is used, I preferably make the plate 55 shorter than the block 54 so that the lug 53 will never hit against any metal. The driving member 44 has studs 57 to which any suitable engine driving member may be attached. Adapted to fit over the studs 57 to close up the conical shaped opening 58 is a plate 59, packing 60 being used inside the plate 59 to make the device as near dustproof as possible.

In operatively mounting the device on the magneto, I make use of a front mounting plate 61 and a rear mounting plate 62. These plates have corresponding ears 63 and holes 64 through which studs 65 pass. Plate 61 has a groove 66 and a corresponding groove 67 is also cut in plate 62. Positioned within the grooves 66 and 67 is a cover strap 68 having a reinforced edge 69 and a cover plate 70 extending over the opening shown in Figure 19. The edge 69 is preferably made of a strip of hardened steel riveted to the strap 68 for the purpose of engaging the nose 37 of the dogs 33 in a manner to be explained.

Coming now to the operation of my device and considering the impulse feature first, when the engine is cranked and driving effort is applied to the studs 57, the magneto shaft is started in rotation but at the beginning of this operation one of the weighted arms 28 will be in such a position as to hold one of the dogs 33 in the position shown in Figures 1 and 5 and the nose 37 will engage the re-inforced edge 69 which, being fastened to the strap 68 that is clamped in a stationary position between the plates 61 and 62 as hereinbefore described, the casings 11 and 18 are held stationary and the driving member 44 moves forward and through the medium of the lug 53 compresses the spring 52 storing energy therein. At the same time the movement of the member 44 and the hub 43 and fingers 42 rotates the member 20 until the teeth 40 engages the teeth 26 and the member 25 is caused to rotate, and the notch 27 engaging the stud 29 will carry the arms 28 outward and the dogs 33 will be drawn inward toward the interior of the casing 18 whereby the nose 37 is disengaged from the re-inforced edge 69 and under the influence of the stored energy in the spring 52 the shaft 2 and the mechanism connected thereto will be thrown suddenly forward producing a strong spark from the magneto. As the parts are thrown forward the stud 49 comes into sudden engagement with the lug 53 but the shock is absorbed by the buffer spring 51 as previously explained. Should the engine start on the first impulse then the increased speed will hold the arms 28 in the position shown in Figure 6, to which they have been moved as above explained and the dogs 33 will be held out of engagement with the edge 69 of strap 68 until the speed has fallen below a certain predetermined value when the weighted arms 28 will move inward and carry the dogs outward and the device will automatically begin to deliver impulses and augmented sparks to the engine. Since the casing 18 is fastened to the casing 11 through the mechanism previously described automatic control of the spark between the driving member 44 and the magneto shaft 2 in proportion to the speed of the engine crank shaft will take place as already described.

It will be observed that the time of producing the impulse may be quickly varied by loosening the studs 65 and shifting the strap 68 in the grooves 66 and 67 of the plates 61 and 62 after which the studs 65 are tightened in place. This is a very important feature of my invention as it provides a means of getting quick and wide adjustment of the impulse mechanism. The cover 70 passing over the opening between the ends of the strap 68 conceals the nose 37 of the dogs 33 so that they will not catch anyone working around the device.

As shown in Figure 21, I do away with the side plates 61 and 62 and studs 65 and enclose the mechanism in a two part casing, one part 71 of which carries a fixed stop 72 which is adapted to be engaged by the nose 37 of the dogs 33. The stop 72 is adapted to be held from rotation by being seated in either one of the recesses 73 of the order part of the casing 74 depending on the direction of rotation.

In many cases the installation of my device is preferably made within a casing such as shown in Figures 21 and 22 although it will be understood that the manner of enclosure may be varied over wide limits as indeed the details of construction of the various parts may be varied over a wide range without departing from the spirit of my invention and the scope of the appended claims.

Having thus described my invention, what I claim is:—

1. In a device of the class described, a unitary structure consisting of a member adapted to be fastened to an ignition shaft, weighted arms responsive to centrifugal force connected to said member, a casing having studs fastened thereto for carrying said arms, a second casing positioned within the first casing and rotatably held thereto by said studs and carrying the following members; bearing sleeves on said studs, weighted arms pivoted on said sleeves and having a pin on one side of said pivot and a tripping dog pivoted on the end of the arm opposite said pin, said dog being positioned in the side wall of the casing and adapted to be extended or withdrawn by the movement of said arms to which it is attached, members positioned on said sleeve and having teeth cut thereon and a notch to engage the said pin, a member centrally located and having teeth on its outer periphery to engage the first mentioned teeth and slots on its inner periphery, a plate supported on the casing over said studs above the aforesaid members and carrying an impulse spring; and a driving member for closing the opening into the second casing and having a hub for engaging the impulse spring and fingers for engaging the slots in said centrally located member in the second casing whereby the same may be turned to move said arms and dogs as described.

2. In a device of the class described, a unitary structure consisting of a two section casing one enclosing a driven member that is adapted to be mounted for rotation on an ignition shaft and the other section positioned within and closing the opening into the first section, a driving member for applying torque to the ignition shaft through the casing sections and closing the opening into the second mentioned casing, said section having its opening closed by the driving member containing mechanism for increasing over a predetermined angular interval the rotative speed of the ignition shaft above that impressed thereon by said driving member and the section enclosing the driven member containing mechanism for automatically adjusting the angular relationship of the driving member and ignition shaft in proportion to the speed of the driving member.

3. In a device of the class described, a unitary structure consisting of a two section casing one enclosing a driven member that is adapted to be mounted for rotation on an ignition shaft and the other section positioned within and closing the opening into the first section, a driving member for applying torque to the ignition shaft through the casing sections and closing the opening into the second mentioned casing, said section, having its opening closed by the driving member, containing mechanism, one element of which normally protrudes beyond the periphery of the wall of said section casing for increasing over a predetermined angular interval to rotative speed of the ignition shaft above that impressed thereon by said driving member and the section, enclosing the driven member, containing mechanism for automatically adjusting the angular relationship of the driving member and ignition shaft in proportion to the speed of the driving member, a combined housing and stop means for said unitary structure consisting of: a pair of mounting plates having annular grooves therein, a cover strap extending into said grooves and means for clamping said mounting plates together against the strap and to the generator frame and a cover plate carried by the driving member within the outer of said mounting plates, said housing and cover plate serving to effectually prevent the entrance of foreign bodies into the unitary structure, said cover plate engaging said protruding element to cause the said speed increasing mechanism to produce starting impulses as described.

4. In a device of the class described, a unitary structure consisting of a two section casing adapted to be mounted for rotation on an ignition shaft, a driving member for applying torque to the ignition shaft through the casing sections, one of said sections containing mechanism one element of which normally protrudes beyond the periphery of the wall of the casing for increasing over a predetermined angular interval the rotative speed of the ignition shaft above that impressed thereon by said driving member and the other section containing mechanism for automatically adjusting the angular relationship of the driving member and ignition shaft in proportion to the speed of the driving member, and housing means fastened to the ignition generator for enclosing said unitary structure, a part of said housing means engaging said protruding element to cause the impulse mechanism to work and being adjustable to vary the time of the impulse interval.

5. In a device of the class described, a unitary structure consisting of a two section casing one positioned within the other and mounted for rotation on an ignition shaft, a driving member positioned in the outer section and closing its opening, said outer section containing mechanism connected to the driving member and to the casing for giving a starting impulse to the ignition shaft, said inner section having studs fastened thereto and extending into the outer section, said studs supporting members in the outer section, which are responsive to centrifugal force for controlling the impulse mechanism, said inner section containing mechanism controlled by and including members responsive to centrifugal force and supported on said studs for connecting the said section to the ignition shaft for automatically adjusting the angular relationship of the driving member and ignition shaft in proportion to the speed of rotation of the driving shaft.

6. In a combined impulse starter and spark governor for ignition generators, a driven member connected to the shaft of said generator, a casing within which said driven member is centrally positioned. studs carried by said casing, members pivoted on said studs responsive to centrifugal force having connecting means with said driven member whereby the same is shifted with relation to the said casing in accordance with the movement of said centrifugally responsive members, a second casing positioned within the first mentioned casing and having openings to receive said studs. a plate embracing said studs supported within said second casing and carrying an impulse spring, a driving member adapted to close the opening in the said second casing and having means for engaging said impulse spring, means for holding the said two casings and driven member from rotation during a given interval whereby the driving member stores energy in said spring, means operated by the driving member for releasing said holding means to allow the spring to move the said casings and driven member quickly to produce a spark from the generator, said operated means being mounted within the second casing and responsive to centrifugal force to retain the means in a neutral position above a predetermined speed, as and for the purpose described.

7. In a combined impulse starter and spark governor for ignition generators, a driven member connected to the shaft of said generator, a casing within which said driven member is centrally positioned, studs carried by said casing, members pivoted on said studs responsive to centrifugal force having connecting means with said driven member whereby the same is shifted with relation to the said casing in accordance with the movement of said centrifugally responsive members, a second casing positioned within the first mentioned casing and having openings to receive said studs, a plate embracing said studs supported within said second casing and carrying an impulse spring, a driving member adapted to close the opening in the said second casing and having means for engaging said impulse spring, an enclosing housing for said casings consisting of; a pair of mounting plates having annular grooves therein, a cover strap having a reinforced edge carried by said grooves with means for clamping said mounting plates together against the strap and to the generator's frame and a cover plate carried by the driving member, means for holding the said two casings and driven member from rotation during a given interval whereby the driving member stores energy in said spring, said means consisting of a dog adapted to protrude through the side wall of the second casing into engagement with the reinforced edge on the said cover strap, means operated by the driving members for withdrawing said dog from engagement with said strap to allow the spring to move the said casings and driven members quickly to produce a spark from the generator, said operated means being mounted within the second casing and responsive to centrifugal force to retain the means in a neutral position above a predetermined speed, as and for the purpose described.

In witness whereof, I affix my signature.

EDWARD MOORE.